United States Patent [19]

Peru et al.

[11] Patent Number: 5,375,496
[45] Date of Patent: Dec. 27, 1994

[54] DEVICE FOR SIMULTANEOUS SHEARING OF TWO SHEET METAL BLANKS

[75] Inventors: Gilles Peru; Francis Sauvage, both of Dunkerque; Yvon Le Roy, Le Doulieu; Charles Sion, Camphin-En-Carembault, all of France

[73] Assignee: Sollac, Puteaux, France

[21] Appl. No.: 990,194

[22] Filed: Dec. 14, 1992

[30] Foreign Application Priority Data

Dec. 19, 1991 [FR] France .................. 91 15822

[51] Int. Cl.$^5$ .................................. B23D 15/08
[52] U.S. Cl. .......................... 83/613; 83/694; 83/697
[58] Field of Search ............... 83/213, 214, 272, 375, 83/380, 566, 613, 618, 620, 694, 697

[56] References Cited

U.S. PATENT DOCUMENTS 2,951,411  9/1960  Subilia ........................ 83/618
3,823,630  7/1974  Suominen et al. ............. 83/618

FOREIGN PATENT DOCUMENTS 89944  9/1983  European Pat. Off. .
405143 1/1991  European Pat. Off. .

OTHER PUBLICATIONS

US patent application Ser. No. 07/990,194, filed Dec. 14, 1992, now pending.
US patent application Ser. No. 08/135,619, filed Oct. 14, 1993, now pending.

Primary Examiner—Hien H. Phan
Attorney, Agent, or Firm—Oblon, Spivak, McClelland, Maier & Neustadt

[57] ABSTRACT

The subject of the invention is a device for simultaneous shearing of two sheet metal blanks comprising, for each sheet metal blank, an assembly formed, on the one hand, by a support member of the corresponding sheet metal blank comprising a rectilinear cutting edge and, on the other hand, by a movable cutter provided with a rectilinear cutting edge designed to interact with the cutting edge of the corresponding support member. The cutting edges of the two support members and cutters assemblies are situated in a same reference plane P and the support members extend on either side of the reference plane P. The invention applies to installations for welding by laser beam of two sheet metal blanks placed edge to edge.

6 Claims, 1 Drawing Sheet

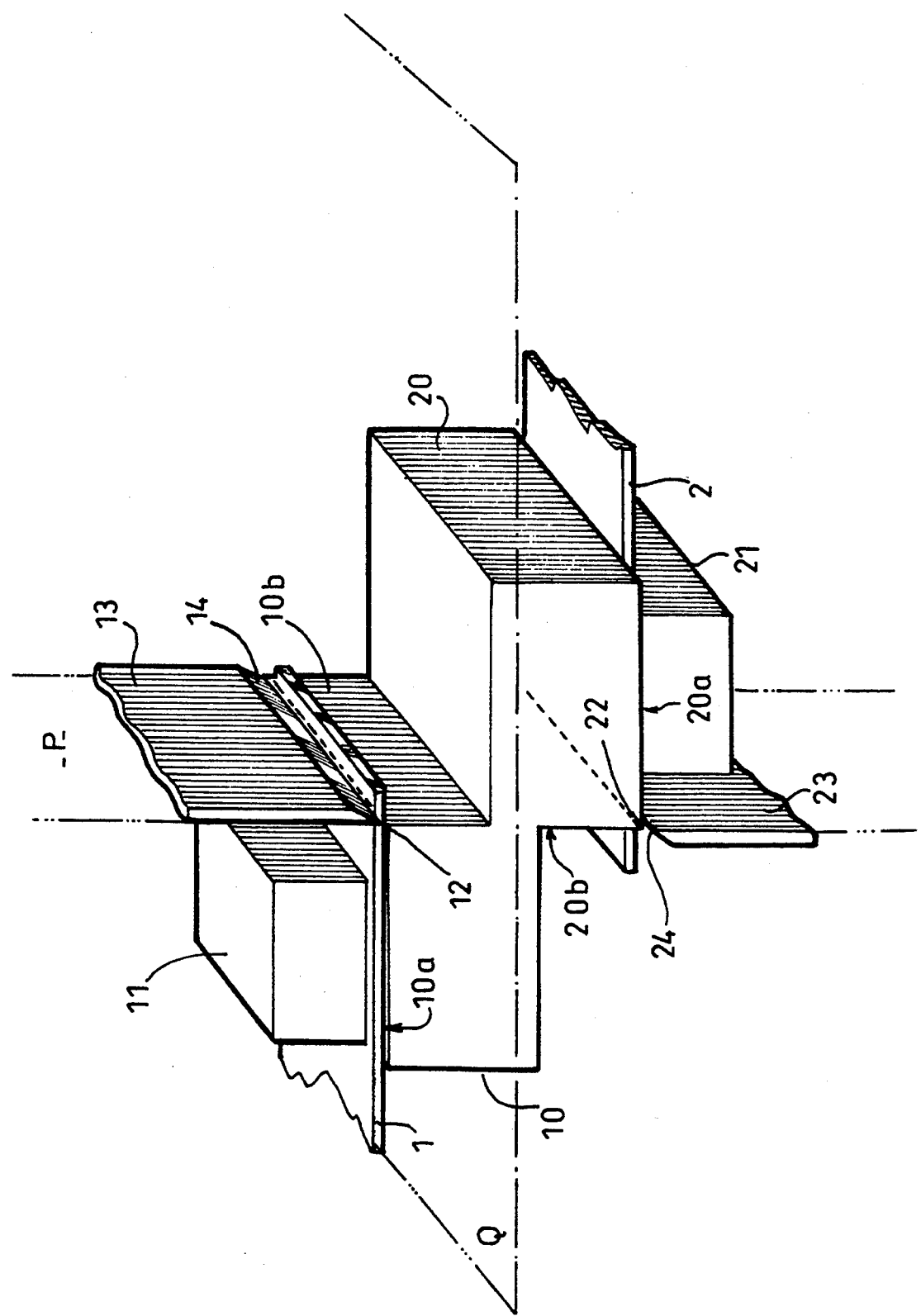

DEVICE FOR SIMULTANEOUS SHEARING OF TWO SHEET METAL BLANKS

BACKGROUND OF THE INVENTION

The subject of the invention is a device for simultaneous shearing of two sheet metal blanks, particularly for an installation for welding by laser beam two sheet metal blanks placed edge to edge.

Installations for welding by laser beam two sheet metal blanks necessitate a device for shearing the edges to be welded of the sheet metal blanks, a device for lateral positioning of the edge of one of the sheet metal blanks in the plane of the laser beam, a device for bringing the two sheet metal blanks edge to edge and lastly a device for maintaining the two sheet metal blanks edge to edge and for feeding these two blanks under the laser beam.

The shearing device can be separate from the welding installation or integrated into this installation.

The shearing devices used hitherto are of two types, either they perform the successive shearing of the sheet metal blanks, or they perform the simultaneous shearing of the two sheet metal blanks intended to be welded edge to edge.

In a general way, the devices for the simultaneous shearing of two sheet metal blanks comprise, for each sheet metal blank, an assembly formed, on the one hand, by a support member of the corresponding sheet metal blank associated with at least one member for maintaining the sheet metal blank on the support member and comprising a rectilinear cutting edge and, on the other hand, by a movable cutter provided with a rectilinear cutting edge designed to interact with the cutting edge of the corresponding support member.

These devices for simultaneous shearing do not make it possible to position directly the cut edges of the sheet metal blanks in the plane of the laser beam, this necessitating an additional operation and device for transfer and positioning of these edges to be welded.

SUMMARY OF THE INVENTION

The present invention aims to remedy the abovementioned disadvantages of the known shearing devices by creating a shearing device for example integrated into an installation for welding by laser beam which while being of a simple construction, makes it possible to position the cut edges of the two sheet metal blanks in the plane of the laser beam.

The subject of the present invention therefore is a device for the simultaneous shearing of two sheet metal blanks comprising, for each sheet metal blank, an assembly formed, on the one hand, by a support member of the corresponding sheet metal blank associated with at least one member for maintaining the sheet metal blank on the support member and comprising a rectilinear cutting edge and, on the other hand, by a movable cutter provided with a rectilinear cutting edge designed to interact with the cutting edge of the corresponding support member, characterized in that the cutting edges of the two support member-cutter assemblies are situated in a same reference plane and the support members extend on either side of the reference plane.

According to other features of the invention:

the support members are formed of one monobloc piece comprising, on either side of a plane of symmetry, a first flat surface supporting the corresponding sheet metal blank and a second flat surface situated in the reference plane, the intersection of the two flat surfaces forming the cutting edge of the corresponding support member, the flat surfaces supporting the sheet metal blanks are parallel to one another, the flat surfaces supporting the sheet metal blanks are parallel to the plane of symmetry, the plane of symmetry is perpendicular to the reference plane, the reference plane is vertical.

BRIEF DESCRIPTION OF THE DRAWINGS

The invention will be better understood in light of the following description, made with reference to the accompanying drawing, given solely by way of example and in which the single FIGURE is a view in perspective of a preferred embodiment of the shearing device according to the invention.

DESCRIPTION OF THE PREFERRED EMBODIMENTS

The device for the simultaneous shearing of two sheet metal blanks 1 and 2 shown in the drawing is designed to be integrated into an installation for welding by laser beam the sheet metal blanks placed edge to edge.

This shearing device comprises, for the sheet metal blank 1, an assembly formed, on the one hand, by a support member 10 of the sheet metal blank 1 associated with at least one member 11 for maintaining the sheet metal blank 1 on the support member 10 and comprising a rectilinear cutting edge 12 and, on the other hand, a movable cutter 13 provided with a rectilinear cutting edge 14 designed to interact with the cutting edge 12 in order to cut the edge to be welded of the sheet metal blank 1.

In identical manner, the shearing device comprises, for the sheet metal blank 2, an assembly formed, on the one hand, by a support member 20 of the sheet metal blank 2 associated with at least one member 21 for maintaining the sheet metal blank 2 on the support member 20 and comprising a rectilinear cutting edge 22 and, on the other hand, a movable cutter 23 provided with a rectilinear cutting edge 24 designed to interact with the cutting edge 22 in order to cut the edge to be welded of the sheet metal blank 2.

The cutting edges 12 and 14 of the first support member 10 — cutter 13 assembly and the cutting edges 22 and 24 of the second support member 20 — cutter 23 assembly are situated in a same reference plane P and the support member 10 and 20 extend on either side of the reference plane P.

The support member 10 comprises a first flat surface 10a supporting the sheet metal blank 1 and a second flat surface 10b situated in the reference plane P, the intersection of the two flat surfaces 10a and 10b forming the cutting edge 12.

The support member 20 comprises a first flat surface 20a supporting the sheet metal blank 2 and a second flat surface 20b situated in the reference plane P, the intersection of the two flat surfaces 20a and 20b forming the cutting edge 22.

According to a preferred embodiment of the invention shown in the single FIGURE, the support members 10 and 20 are formed of one monobloc piece comprising, on one side of a plane of symmetry Q, the first flat surface 10a and the second flat surface 10b of the support member 10 and, on the other side of the said plane of symmetry Q, the first flat surface 20a and the second flat surface 20b of the support member 20, the flat surfaces 10b and 20b being situated in the reference plane P.

According to another embodiment, the support members 10 and 20 may be constituted by two independent parts connected to one another in such a manner that the surfaces 10b and 20b are situated in the reference plane P.

The flat surfaces 10a and 20a supporting the sheet metal blanks 1 and 2 are parallel to one another and are possibly parallel to the plane of symmetry Q.

Moreover, this plane of symmetry Q may be perpendicular to the reference plane P.

The reference plane may be vertical.

The shearing of the edges to be welded of the sheet metal blanks 1 and 2 is carried out in the following manner.

The sheet metal blanks 1 and 2 are set respectively on the flat surfaces 10a and 20a of the support members 10 and 20 so that the edges to be sheared project beyond the cutting edges 12 and 22 and are maintained in this position respectively by the maintaining members 11 and 21.

Then, the cutter 13 is caused to descend and the cutter 23 to rise, this cutting an off-cut from each sheet metal blank 1 and 2.

By virtue of the symmetry of the shearing device and by virtue of the fact that the cutting edges 12, 14 and 22, 24 are situated in the same reference plane P, the cut edges of the two sheet metal blanks 1 and 2 are therefore positioned in the said reference plane P, which in a welding installation corresponds to the plane of the laser beam.

Consequently, from the moment of the shearing, the edges to be welded of the sheet metal blanks 1 and 2 are prepositioned and it is sufficient to bring them progressively into contact with one another while maintaining them by an appropriate device in the reference plane, and then to transfer them thus positioned edge to edge as far as the laser beam in order to weld them.

The shearing device according to the invention makes it possible to avoid, in an installation for welding by laser beam, the setting up of a device for positioning the edges to be welded of the two sheet metal blanks after the shearing, which simplifies the installation and thereby reduces the risks of misalignment of the said edges with respect to the laser beam, thus contributing to the obtaining of a weld of better quality.

We claim:

1. A device for simultaneously shearing two sheet metal blanks, the device comprising;

a first support member for supporting a first sheet metal blank, said first support member comprising a first rectilinear cutting edge;

a first maintaining member for maintaining the first sheet metal blank on said first support member;

a first movable cutter comprising a second rectilinear cutting edge which interacts with said first rectilinear cutting edge of said first support member;

a second support member for supporting a second sheet metal blank, said second support member comprising a third rectilinear cutting edge;

a second maintaining member for maintaining the second sheet metal blank on said second support member; and a second movable cutter comprising a fourth rectilinear cutting edge which interacts with said third rectilinear cutting edge of said second support member;

wherein:

said first rectilinear cutting edge of said first support member, said second rectilinear cutting edge of said first movable cutter, said third rectilinear cutting edge of said second support member, and said fourth rectilinear cutting edge of said second movable member are situated in a same reference plane and said first and second support members extend on either side of said reference plane.

2. A device according to claim 1, wherein said first and second support members are formed of one monobloc piece, said first and second support members comprising, on either side of a plane of symmetry, a first flat surface on said first support member for supporting the first sheet metal blank, a second flat surface on said second support member for supporting the second sheet metal blank, a third flat surface on said first support member situated in the reference plane, and a fourth flat surface on the second support member situated in the reference plane, wherein an intersection of the first and third flat surfaces of the first support member forms the first rectilinear cutting edge of the first support member, and an intersection of the second and fourth flat surfaces of the second support member forms the third rectilinear cutting edge of the second support member.

3. A device according to claim 2, wherein the first flat surface of the first support member and the second flat surface of the second support member are parallel to one another.

4. A device according to claim 2, wherein the first flat of the first support member and the second flat surface of the second support member are parallel to the plane of symmetry.

5. A device according to claim 2, wherein the plane of symmetry is perpendicular to the reference plane.

6. A device according to claim 1, wherein the reference plane is vertical.

* * * * *